United States Patent
Yu

(10) Patent No.: US 11,080,430 B2
(45) Date of Patent: Aug. 3, 2021

(54) INTEGRITY OF COMMUNICATIONS BETWEEN BLOCKCHAIN NETWORKS AND EXTERNAL DATA SOURCES

(71) Applicant: Advanced New Technologies Co., Ltd., Grand Cayman (KY)

(72) Inventor: Yirong Yu, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

(21) Appl. No.: 16/714,460

(22) Filed: Dec. 13, 2019

(65) Prior Publication Data
US 2020/0313903 A1    Oct. 1, 2020

Related U.S. Application Data

(63) Continuation of application No. PCT/CN2019/096032, filed on Jul. 15, 2019, and a
(Continued)

(51) Int. Cl.
*G06F 21/64* (2013.01)
*H04L 9/30* (2006.01)
(Continued)

(52) U.S. Cl.
CPC ............ *G06F 21/64* (2013.01); *H04L 9/0637* (2013.01); *H04L 9/0643* (2013.01); *H04L 9/088* (2013.01);
(Continued)

(58) Field of Classification Search
CPC ... H04L 9/3239; H04L 9/3247; H04L 9/3236; H04L 9/321; H04L 9/0861; H04L 63/123;
(Continued)

(56) References Cited

U.S. PATENT DOCUMENTS 7,698,398 B1   4/2010   Lai
8,069,435 B1   11/2011  Lai
(Continued)

FOREIGN PATENT DOCUMENTS

CN    101102257    1/2008
CN    101207613    6/2008
(Continued)

OTHER PUBLICATIONS

Extended European Search Report in European Application No. 19732212.6 dated Apr. 20, 2020, 11 pages.
(Continued)

*Primary Examiner* — Tae K Kim
(74) *Attorney, Agent, or Firm* — Fish & Richardson P.C.

(57) ABSTRACT

Methods, systems, and apparatus, including computer programs encoded on computer storage media, for enhancing blockchain network security. Embodiments include generating a request for data from a data source, the request including plaintext data and encrypted data, the encrypted data including access data and a hash of the plaintext data, transmitting the request to a relay system component external to the blockchain network, receiving a result from the relay system component that is digitally signed using a private key of the relay system component, and verifying an integrity of the result based on a public key of the relay system component and a digital signature of the result.

21 Claims, 8 Drawing Sheets

Related U.S. Application Data continuation-in-part of application No. PCT/CN2019/709800, filed on Mar. 27, 2019, and a continuation-in-part of application No. PCT/CN2019/080478, filed on Mar. 29, 2029.

(51) Int. Cl.

| | | |
|---|---|---|
| *H04L 9/32* | (2006.01) | |
| *H04L 9/06* | (2006.01) | |
| *H04L 9/08* | (2006.01) | |
| *H04L 9/14* | (2006.01) | |

(52) U.S. Cl.
CPC .................. *H04L 9/14* (2013.01); *H04L 9/30* (2013.01); *H04L 9/3073* (2013.01); *H04L 9/3242* (2013.01); *H04L 9/3247* (2013.01); H04L 2209/38 (2013.01)

(58) Field of Classification Search
CPC . H04L 63/12; H04L 63/0281; H04L 2209/38; H04L 2209/56; H04L 2209/76; G06Q 20/389; G06Q 40/04; G06Q 20/02
See application file for complete search history.

(56) References Cited

U.S. PATENT DOCUMENTS

| | | | |
|---|---|---|---|
| 8,601,569 B2 | 12/2013 | Segre et al. | |
| 9,537,862 B2 | 1/2017 | Bathija et al. | |
| 9,680,872 B1* | 6/2017 | Roth | G06F 21/44 |
| 10,243,748 B1 | 3/2019 | Callan et al. | |
| 10,250,395 B1 | 4/2019 | Borne-Pons et al. | |
| 10,671,372 B2 | 6/2020 | Marks et al. | |
| 10,708,068 B2 | 7/2020 | Cheng et al. | |
| 10,778,603 B2 | 9/2020 | Yu et al. | |
| 2006/0206616 A1 | 9/2006 | Brown | |
| 2007/0016788 A1* | 1/2007 | Kakehi | H04L 9/3247 713/176 |
| 2007/0073876 A1 | 3/2007 | Shima | |
| 2011/0087887 A1* | 4/2011 | Luft | H04L 9/3247 713/178 |
| 2012/0017090 A1 | 1/2012 | Gould et al. | |
| 2016/0191524 A1 | 6/2016 | Bathija et al. | |
| 2017/0270319 A1 | 9/2017 | Salmon-Legagneur et al. | |
| 2017/0300898 A1* | 10/2017 | Campero | H04L 9/3236 |
| 2017/0346807 A1* | 11/2017 | Blasi | G06F 21/33 |
| 2017/0352027 A1* | 12/2017 | Zhang | G06Q 20/3678 |
| 2017/0353309 A1* | 12/2017 | Gray | G06Q 20/3829 |
| 2017/0359184 A1 | 12/2017 | Camenisch et al. | |
| 2017/0372300 A1 | 12/2017 | Dunlevy et al. | |
| 2018/0089758 A1 | 3/2018 | Stradling et al. | |
| 2018/0097635 A1 | 4/2018 | Moses | |
| 2018/0191503 A1 | 7/2018 | Alwar et al. | |
| 2018/0204213 A1 | 7/2018 | Zappier et al. | |
| 2018/0219685 A1* | 8/2018 | Deery | H04L 9/3236 |
| 2018/0241572 A1* | 8/2018 | Miele | H04L 63/08 |
| 2018/0254898 A1 | 9/2018 | Sprague et al. | |
| 2018/0287780 A1 | 10/2018 | Safford et al. | |
| 2018/0309567 A1 | 10/2018 | Wooden | |
| 2019/0005470 A1* | 1/2019 | Uhr | G06Q 20/02 |
| 2019/0034459 A1 | 1/2019 | Qiu | |
| 2019/0036682 A1 | 1/2019 | Qiu | |
| 2019/0036711 A1 | 1/2019 | Qiu | |
| 2019/0058577 A1* | 2/2019 | Bowman | G06F 9/44505 |
| 2019/0058696 A1* | 2/2019 | Bowman | H04L 9/3236 |
| 2019/0116038 A1 | 4/2019 | Sprague | |
| 2019/0158275 A1 | 5/2019 | Beck | |
| 2019/0163912 A1* | 5/2019 | Kumar | H04L 12/66 |
| 2019/0164153 A1* | 5/2019 | Agrawal | H04L 9/3218 |
| 2019/0164220 A1 | 5/2019 | Raj et al. | |
| 2019/0190724 A1 | 6/2019 | Sundaresan et al. | |
| 2019/0207755 A1 | 7/2019 | Gu et al. | |
| 2019/0245693 A1 | 8/2019 | Lyer et al. | |
| 2019/0279206 A1* | 9/2019 | Song | G06F 16/1805 |
| 2019/0281028 A1 | 9/2019 | Gillan et al. | |
| 2019/0288854 A1 | 9/2019 | Xie et al. | |
| 2019/0303541 A1 | 10/2019 | Reddy et al. | |
| 2019/0305959 A1* | 10/2019 | Reddy | G06F 8/60 |
| 2019/0311392 A1 | 10/2019 | Swamidurai | |
| 2019/0312863 A1 | 10/2019 | Chow et al. | |
| 2019/0372762 A1* | 12/2019 | Shainski | H04L 9/0894 |
| 2020/0067922 A1 | 2/2020 | Avetisov et al. | |
| 2020/0089915 A1 | 3/2020 | Falk | |
| 2020/0167770 A1 | 5/2020 | Kurian et al. | |
| 2020/0322132 A1* | 10/2020 | Covaci | H04L 9/3247 |

FOREIGN PATENT DOCUMENTS

| | | |
|---|---|---|
| CN | 103679436 | 3/2014 |
| CN | 107003916 | 8/2017 |
| CN | 107079036 | 8/2017 |
| CN | 107896213 | 4/2018 |
| CN | 108073829 | 5/2018 |
| CN | 108171083 | 6/2018 |
| CN | 108305170 | 7/2018 |
| CN | 108846776 | 11/2018 |
| CN | 107579826 | 12/2018 |
| CN | 108965342 | 12/2018 |
| CN | 109191108 | 1/2019 |
| CN | 208335190 | 1/2019 |
| CN | 109299338 | 2/2019 |
| CN | 109327512 | 2/2019 |
| CN | 109345259 | 2/2019 |
| EP | 2495932 | 7/2015 |
| EP | 3297206 | 3/2018 |
| JP | 2019008791 | 1/2019 |
| TW | 201812673 | 4/2018 |
| TW | M561279 | 6/2018 |
| TW | I636411 | 9/2018 |
| WO | WO 2013123548 | 8/2013 |
| WO | WO 2016048575 | 3/2016 |
| WO | WO 2018052726 | 3/2018 |
| WO | WO 2018193355 | 10/2018 |
| WO | WO 2018223042 | 12/2018 |

OTHER PUBLICATIONS

Crosby et al., "BlockChain Technology: Beyond Bitcoin," Sutardja Center for Entrepreneurship & Technology Technical Report, Oct. 16, 2015, 35 pages.
Ellis et al. [online], "ChainLink A Decentralized Oracle Network," Sep. 2017, retrieved on Nov. 26, 2019, retrieved from URL<https://link.smartcontract.com/whitepaper>, 38 pages.
Github.com [online], "Ontology Oracle," Janurary 10, 2019, retrieved on Nov. 26, 2019, retrieved from URL <https://github.com/ontio/ontology-oracle>, 10 pages.
Nakamoto, "Bitcoin: A Peer-to-Peer Electronic Cash System," www.bitcoin.org, 2005, 9 pages.
PCT International Search Report and Written Opinion in International Appl. No. PCT/CN2019079800, dated Jan. 2, 2020, 7 pages.
PCT International Search Report and Written Opinion in International Appl. No. PCT/CN2019080478, dated Dec. 30, 2019, 9 pages.
PCT International Search Report and Written Opinion in International Appl. No. PCT/CN2019096030, dated Dec. 27, 2019, 6 pages.
PCT International Search Report and Written Opinion in International Appl. No. PCT/CN2019096032, dated Dec. 27, 2019, 6 pages.
PCT International Search Report and Written Opinion in International Appl. No. PCT/CN2019096036, dated Jan. 2, 2020, 7 pages.
Software.intel.com [online], "Add Enhanced Security to Your Application," 2019, retrieved on Nov. 26, 2019, retrieved from URL<https://softwareintel.com/en-us/sgx/details>, 3 pages.
Software.intel.com [online], "Develop & Deliver More Secure Solutions," 2019, retrieved on Nov. 26, 2019, retrieved from URL<https://softwareintel.com/en-us/sgx>, 5 pages.
Software.intel.com [online], "Enhanced Security Features for Applications and Data In-use," 2019, retrieved on Nov. 26, 2019, retrieved

(56) References Cited

OTHER PUBLICATIONS from URL<https://software.intel.com/sites/default/files/managed/c3/8b/intel-sgx-product-brief-2019.pdf>, 4 pages.
software.intel.com [online], "Intel Software Guard Extensions", 2019, retrieved on Nov. 26, 2019, retrieved from URL <https://softwareintel.com/en-us/sgx>, 5 pages.
Wikipedia.org [online], "Trusted execution environment," Nov. 18, 2019, retrieved on Nov. 26, 2019, retrieved from URL <https://en.wikipedia.org/wiki/Trusted_execution_environment>, 6 pages.
Zhang et al., "Town Crier: An Authenticated Data Feed for Smart Contracts," The 23rd ACM Conference on Computer and Communicaions Security, Oct. 2016, 20 pages.
Extended European Search Report in European Application No. 19770852.2, dated Sep. 8, 2020, 11 pages.
Extended European Search Report in European Application No. 19772245.7, dated Sep. 8, 2020, 11 pages.
Wikipedia.org [online], "Authenticated Encryption," Mar. 2019, retrieved on Sep. 8, 2020, retrieved from URL<https://en.wikipedia.org/w/index.php?title=Authenticated_encryption&oldid=888979048>, 5 pages.
Extended European Search Report in European Application No. 19732236.5, dated May 18, 2020, 8 pages.
Ahmed et al., "Turing Trust Around: Smart Contract-Assisted Public Key Infrastructure," 17th IEEE International Conference on Trust, Security and Privacy in Computing and Communications, Aug. 2018, pp. 104-111.
Yoon et al., "Verifying the Integrity of Private Transaction Information in Smart Contract using Homomorphic Encryption," IEEE Eurasia Conference on IOT, Communication and Engineering (ECICE), Oct. 2019, pp. 38-40.

* cited by examiner

INTEGRITY OF COMMUNICATIONS BETWEEN BLOCKCHAIN NETWORKS AND EXTERNAL DATA SOURCES

CROSS-REFERENCE TO RELATED APPLICATIONS

This application is a continuation of PCT Application No. PCT/CN2019/096032, filed on Jul. 15, 2019, and a continuation in part of PCT Application No. PCT/CN2019/079800, filed on Mar. 27, 2019 and PCT Application No. PCT/CN2019/080478, filed on Mar. 29, 2019, each of which is hereby incorporated by reference in its entirety.

TECHNICAL FIELD

This specification relates to providing data to a blockchain network from an external data source.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular use case. An example of a type of blockchain network can include consortium blockchain networks provided for a select group of entities, which control the consensus process, and includes an access control layer.

Smart contracts are programs that execute within blockchain networks. In some instances, the smart contract running on the blockchain requires input from outside of the blockchain to evaluate pre-defined rules and perform corresponding actions. However, the smart contract itself cannot directly access external data sources. Consequently, a relay agent can be used to retrieve external data, and submit the data to the blockchain for processing by the smart contract. This process, however, can result in security issues, such as leakage of secure information (e.g., credentials that might be required to access an external data source).

Although techniques have been proposed for addressing security issues associated with data retrieval from external data sources, a more effective solution to address the security issues would be advantageous.

SUMMARY

This specification describes technologies for retrieval of data from external data sources for processing within a blockchain network. Embodiments of this specification are directed to a system that coordinates communication from a user computing device through a blockchain network to an Internet-based data source that is external to the blockchain network. More particularly, embodiments of this specification enable the user computing device to encrypt confidential information that may be required to access the Internet-based data using a public key of a relay system node that is used to query the Internet-based data source. In some embodiments, the relay system node encrypts a response using a private key, and the response is verified by the user computing device using the public key. In some embodiments, the relay system node executes a trusted execution environment (TEE), and the public key and the private key are provided through an attestation process of the TEE.

This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
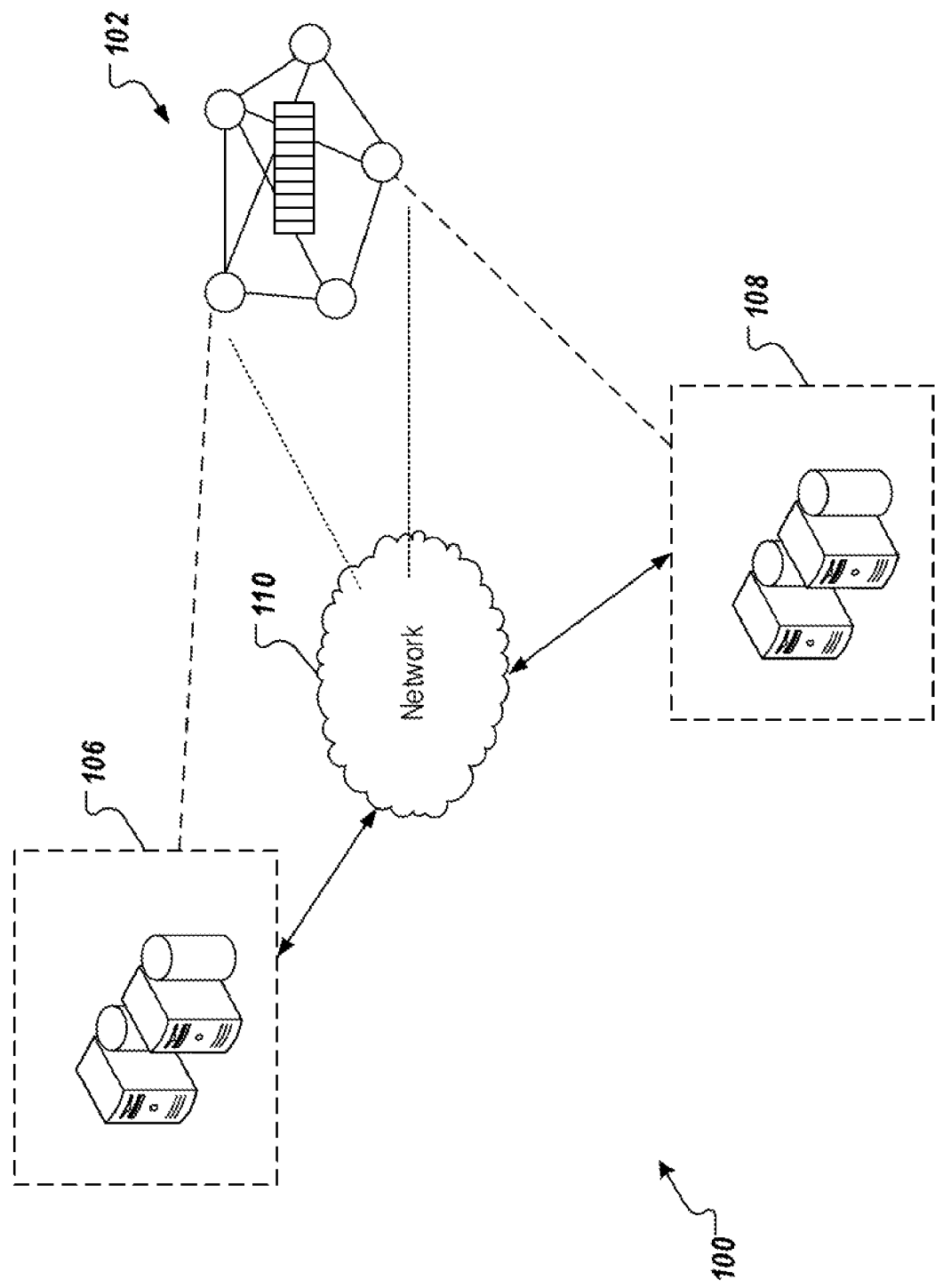
FIG. 1 is a diagram illustrating an example of an environment that can be used to execute embodiments of this specification.

This specification describes technologies for retrieval of data from external data sources for processing within a blockchain network. Embodiments of this specification are directed to a system that coordinates communication from a user computing device through a blockchain network to an Internet-based data source that is external to the blockchain network. More particularly, embodiments of this specification enable the user computing device to encrypt confidential information that may be required to access the Internet-based data source using a public key of a relay system node that is used to query the Internet-based data source. In some embodiments, the relay system node encrypts a response using a private key, and the response is verified by the user computing device using the public key. In some embodiments, the relay system node executes a trusted execution environment (TEE), and the public key and the private key are provided through an attestation process of the TEE.

The techniques described in this specification produce several technical effects. For example, embodiments of this specification ensure the integrity of requests submitted by a user computing device to relay system nodes for querying data sources that are external to a blockchain network. As another example, embodiments of this specification ensure the integrity of responses provided back to the blockchain network from the external data sources. Accordingly, embodiments of the present disclosure improve the integrity of communications between a user computing device and a relay system node through a blockchain network. In this manner, potential attack channels for malicious users are mitigated to enhance security.

To provide further context for embodiments of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. It is contemplated, however, that embodiments of this specification can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

FIG. 1 is a diagram illustrating an example of an environment 100 that can be used to execute embodiments of this specification. In some examples, the environment 100 enables entities to participate in a consortium blockchain network 102. The environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general the network 110 represents one or more communication networks. In some cases, the computing devices 106, 108 can be nodes of a cloud computing system (not shown), or each computing device 106, 108 can be a separate cloud computing system including a number of computers interconnected by a network and functioning as a distributed processing system.

In the depicted example, the computing systems 106, 108 can each include any appropriate computing system that enables participation as a node in the consortium blockchain network 102. Examples of computing devices include, without limitation, a server, a desktop computer, a laptop computer, a tablet computing device, and a smartphone. In some examples, the computing systems 106, 108 host one or more computer-implemented services for interacting with the consortium blockchain network 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
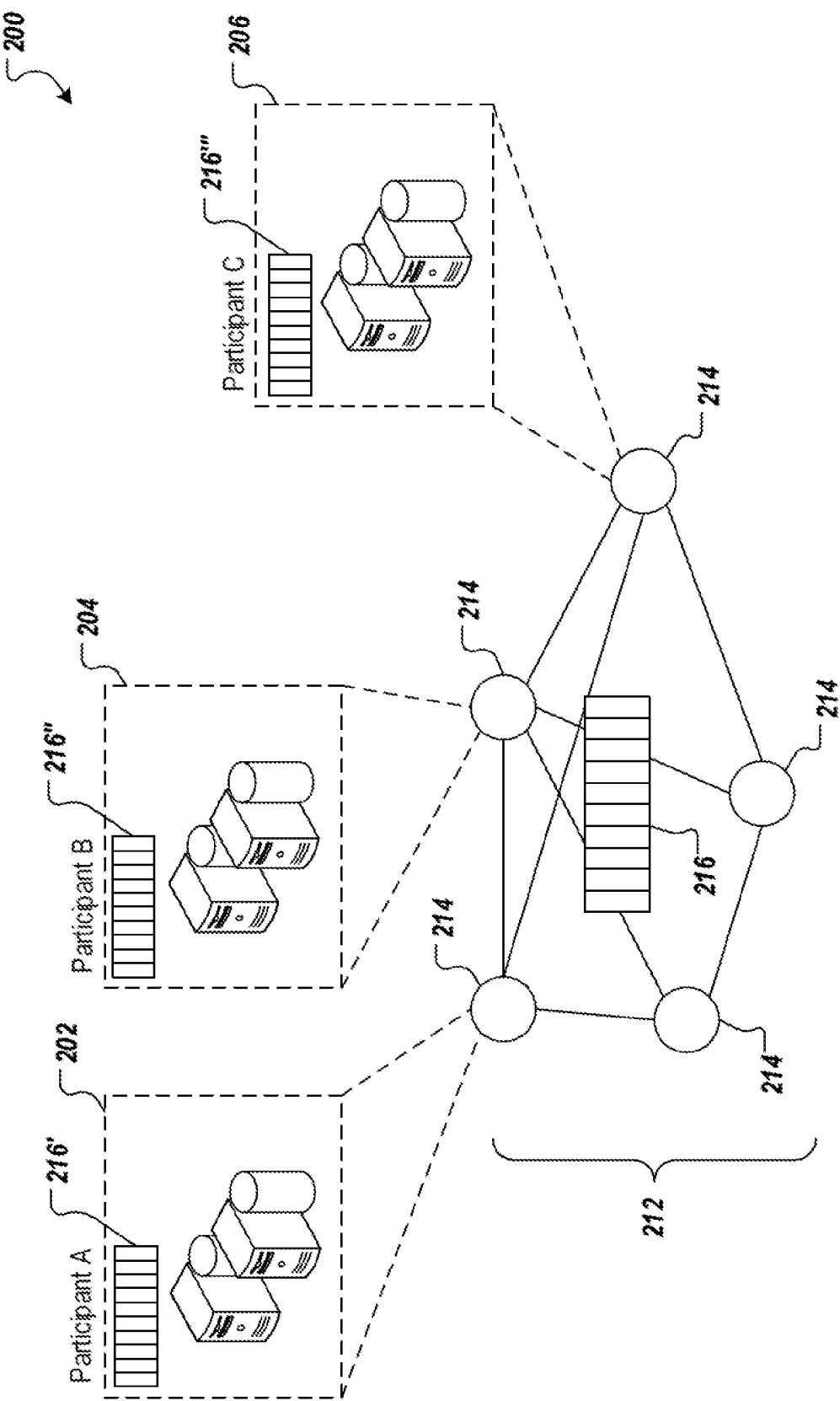
FIG. 2 is a diagram illustrating an example of a conceptual architecture in accordance with embodiments of this specification.

FIG. 2 depicts an example of an architecture 200 in accordance with embodiments of this specification. The example conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including a plurality of nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as miner nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204, and 206 store respective, complete copies 216', 216'', and 216''' of the blockchain 216.

A blockchain (e.g., the blockchain 216 of FIG. 2) is made up of a chain of blocks, each block storing data. Examples of data include transaction data representative of a transaction between two or more participants. While transactions are used herein by way of non-limiting example, it is contemplated that any appropriate data can be stored in a blockchain (e.g., documents, images, videos, audio). Examples of a transaction can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed. Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

In some instances, a smart contract executing within the blockchain network requires input from outside of the blockchain network to evaluate pre-defined rules and perform corresponding actions. By way of non-limiting example, a stock quote might be needed for the smart contract to base a decision on, the stock quote coming from a data source external to the blockchain network. As another non-limiting example, account information for an account that is maintained outside of the blockchain network might be needed to for the smart contract to base a decision on. However, the smart contract itself cannot directly query external data sources.

Traditional approaches include use of a relay agent to retrieve external data, and submit the data to the blockchain for processing by the smart contract. This process, however, can result in security issues, such as leakage of secure information (e.g., credentials that might be required to access an external data source). For example, traditional approaches can use TEE to prove that the relay agent has performed the specified query request honestly. However, and due to the openness of the blockchain, all query requests are visible to all users (nodes) in the blockchain network. Consequently, there is a risk of permission leakage for query requests that require access to external data sources requiring access control (e.g., queries). For example, there is a risk that request strings can be intercepted, modified and replayed, resulting in information leakage, or other problems.

In one traditional approach that uses SGX, the TA, or portion of the TA, executing in an enclave (enclave program) functions as a relay node to access external data sources. For example, the enclave program can send a query request (e.g., HTTPS request) to an Internet-based data source, and can provide the response to the smart contract that initiated the request. In some examples, a privacy field function is provided, which can be used encrypt sensitive information (e.g., access credentials) using the public key of the enclave. In some examples, the relay node uses the private key of the enclave to decrypt the privacy field, invokes the HTTPS client to access the target Internet-based data source, receive the requested data, and use the private key to digitally sign the returned data. After the digital signature, the data is returned to the smart contract that had initiated the request.

Such a traditional approach, however, has disadvantages. An example disadvantage of directly encrypting the privacy field is that the request with the privacy field ciphertext does not have integrity protection. For example, the user carries the encrypted API key field in the request for requesting all authorization information of the Internet-based data source. An attacker can intercept the communication. Although the attacker cannot directly decrypt the plaintext of the API key information, the attacker can modify the request to use the same privacy field to construct a request for accessing information, and send it to the relay node. This can result in leakage of sensitive information (e.g., credentials).

In view of the above context, embodiments of the present specification are directed to querying external data sources (e.g., Internet-based data sources) using a relay system and TEE. More particularly, and as described in further detail herein, embodiments of this specification provide for authorization request integrity check, while protecting sensitive information (e.g., credentials). In this manner, and as described in further detail herein, embodiments of this specification address disadvantages of traditional approaches, such as preventing user rights from leaking.

Figure 3:
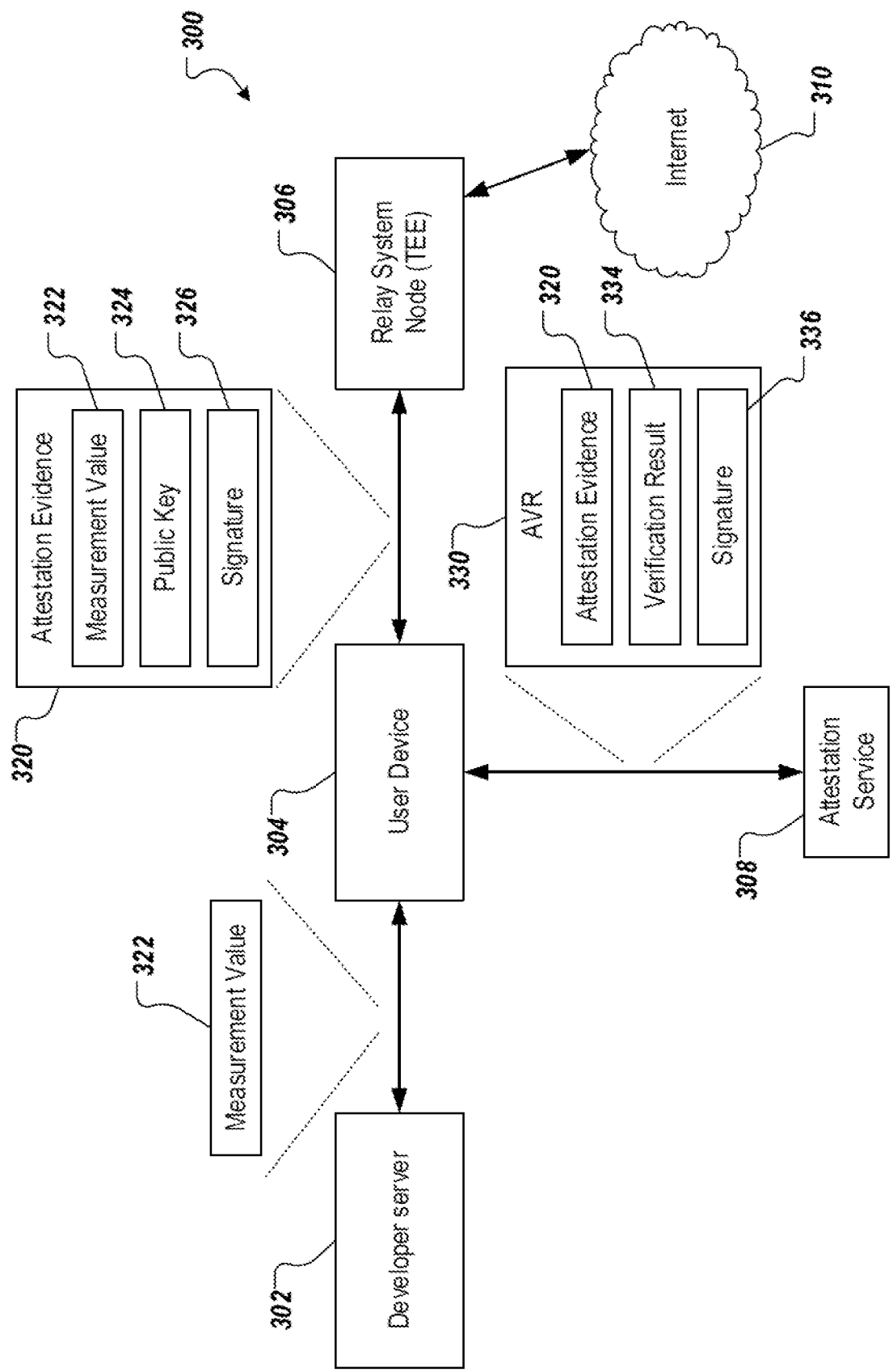
FIG. 3 is a diagram illustrating an example of a system in accordance with embodiments of this specification.

FIG. 3 is a diagram illustrating an example of a system 300 in accordance with embodiments of this specification. As shown, the system 300 includes a developer server 302, a user device 304, a relay system node 306, an attestation service 308, and a network 310 (e.g., Internet). In some embodiments, the relay system node 310 is implemented using a TEE technology (e.g., Intel SGX). In general, the attestation service 308 verifies a legitimacy of the relay system node 306 for the user device 304. An example of an attestation service includes IAS, described above. Note that the system 300 is illustrated as including one relay system node 306 for illustrative purpose only. The system 300 may include any suitable number of relay system nodes 306.

The developer server 302 includes any suitable server, computer, module, or computing element to store and process codes and/or data related to the relay system nodes 306. For example, the developer server 302 may store a source code and a measurement value (e.g., a digest of an initial state of the relay system node 306) of the relay system node 306. As described herein, the developer server 302 is communicatively coupled to the user device 304. For example, the developer server 302 may send the measurement value of the relay system node 306 to the user device 304 upon request.

The user device 304 includes any suitable computer, processor, module, or computing element to enable a client to communicate with the developer server 302, the relay system node 306, and the attestation service 308. For example, the user device 304 may be used by a client to request a data or service from the other components of system 300. The user device 304 can include a graphical user interface (GUI) for a client to interact with the user device 304. In some embodiments, the user device 304 requests an attestation evidence 320 from the relay system node 306. The attestation evidence 320 indicates a legitimacy of the relay system node 306 (e.g., whether the relay system node 306 is a trusted entity) and includes a measurement value 322, a public key 324, and a signature 326. The measurement value 322 may include a digest (e.g., a hash value) of an initial state of the relay system node 306. The public key 324 is associated with the relay system node 306 and can be generated randomly with a private key of the relay system node 306. The signature 326 includes the measurement value 322 and the public key 324 that is signed using an attestation key of the relay system node 306.

In some embodiments, the attestation key of the relay system node 306 includes an enhanced privacy identification (EPID) private key. EPID is an algorithm provided by Intel for attestation of a trusted system, while preserving privacy. In general, each of the members (e.g., a computer or a server) of a network is assigned an EPID private key for signing the attestation evidence, and a verifier of the attestation evidence in the network stores an EPID public key that is paired with the EPID private keys of the other members of the network. Each of the members can generate a signature of the attestation evidence using its own EPID private key, and the verifier can verify the signatures of the other members using the EPID public key. As such, the EPID keys can be used to prove that a device, such as a computer or a server, is a genuine device.

The relay system node 306 includes any suitable server, computer, module, or computing element implemented using a TEE technology (e.g., Intel SGX). The relay system node 306 may generate the attestation evidence 320 upon a request from the user device 304. The relay system node 306 can receive and handle data and/or service requests from the user device 304, and query external data sources in the network 310, for example such as, HTTPS-enabled Internet services. In some embodiments, the relay system node 306 is provisioned with a public key 324 and a private key that is paired with the public key 324. The public key 324 and the paired private key can be used by the relay system node 306 for authentication and encryption of the communication with the user device 304. In some embodiments, the relay system node 306 is further provisioned with an attestation key (e.g., an EPID private key) for signing the attestation evidence 320. The attestation evidence 320 signed with the EPID private key can be verified by the attestation service 308 using an EPID public key.

The attestation service 308 includes any suitable server, computer, module, or computing element to verify the legitimacy of the attestation evidence 320. As noted above, the attestation evidence 320 includes the measurement value 322, the public key 324, and the signature 326 of the relay system node 306. Upon receiving the attestation evidence 320, the attestation service 306 can verify the signature 326 and generate an attestation verification report (AVR) 330.

The attestation service 308 verifies the signature 326 in the attestation evidence 320 using an attestation key (e.g., an EPID public key). After verifying the signature 326 using the EPID public key, the attestation service 308 generates the AVR 330 that includes the attestation evidence 320, a verification result 334 indicating whether the signature 326 in the attestation evidence 320 is valid, and a signature 336 of the attestation service 312.

In some embodiments, the AVR 330 includes the attestation evidence 320 excluding the signature 326 of the relay system node 310. For example, the AVR 330 may include the measurement value 322 of the relay system node 306, the public key 324, the verification result 334, and the signature 336. In some embodiments, the signature 336 includes the attestation evidence 320 and the verification result 334 that are signed using a report signing key (e.g., a private key that the attestation service 312 uses to sign the AVR).

In operation, the user device 304 receives the measurement value 322 of the relay system node 306 from the developer server 302. The user device 304 queries the relay system node 306, receives the attestation evidence 320, and sends the attestation evidence 320 to the attestation service 308. The attestation service 308 verifies the attestation evidence 320 and sends an AVR to the user device 304. The user device 304 verifies the AVR 330 based on the signature 336 and the measurement value 322 in the AVR 330. Upon successfully verifying the AVR 330, the user device 304 determines that the relay system node 306 is a trusted entity and registers (e.g., stores) the public key 324 of the relay system node 306. The verification of the attestation evidence 320 will be discussed below in greater detail with reference to FIG. 4.

Figure 4:
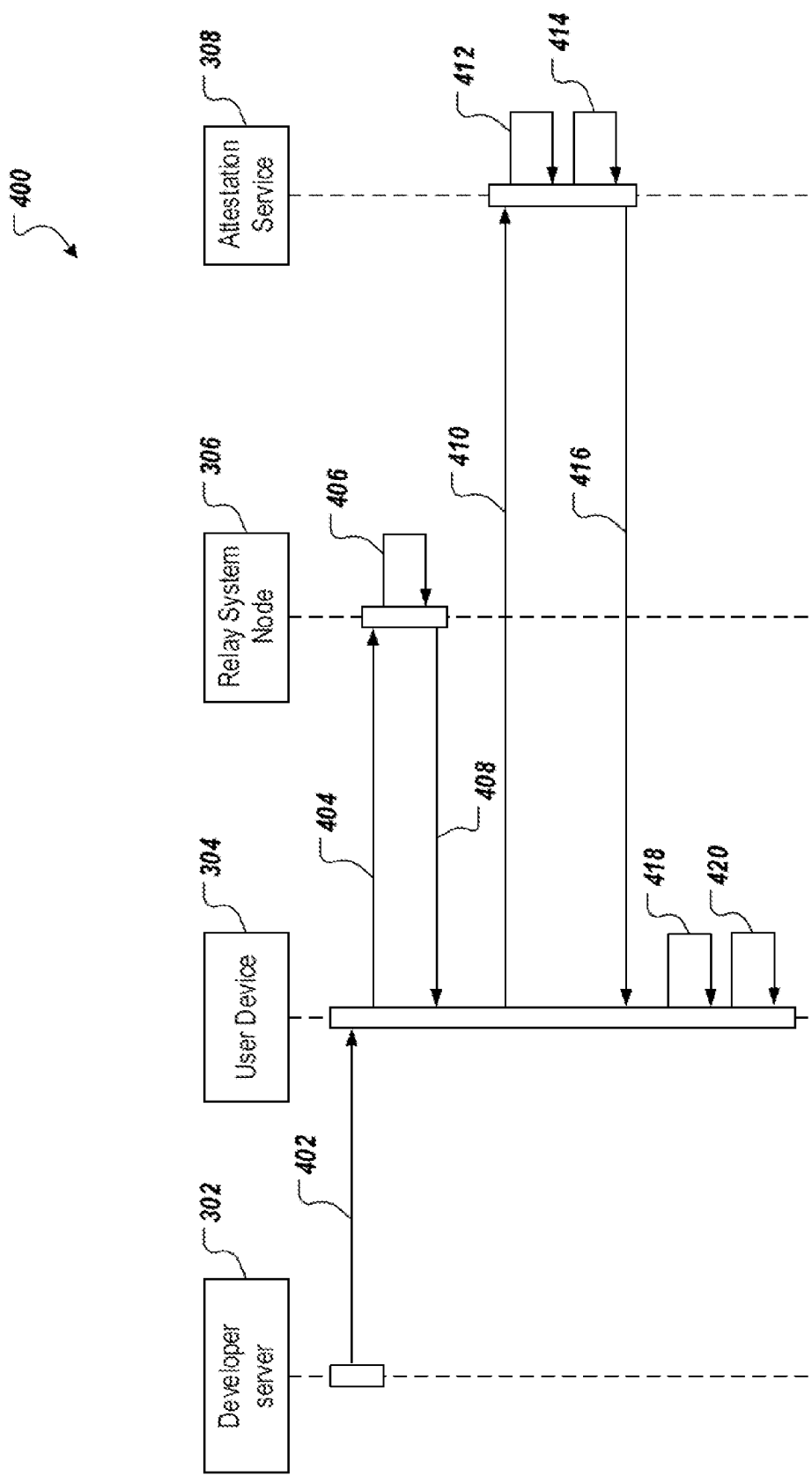
FIG. 4 is a signal flow illustrating an example of a process in accordance with embodiments of this specification.

FIG. 4 depicts an example of a signal flow 400 in accordance with embodiments of this specification. The signal flow 400 represents an attestation verification process. For convenience, the process will be described as being performed by a system of one or more computers, located in one or more locations, and programmed appropriately in accordance with this specification. For example, a distributed system (the system 300 of FIG. 3), appropriately programmed, can perform the process.

In the example of FIG. 4, the developer server 302 sends (402) a measurement value 322 of the relay system node 306 to the user device 304 upon a request from the user device 304. For example, the user device 304 may send a request to the developer server 302 for the measurement values 322 of one of more relay system nodes 306. Upon verifying an identity of the user device, the developer server 302 can send the requested measurement values 322 to the user device 304.

The user device 304 sends (404) an attestation request (e.g., a challenge) to the relay system node 306. The attestation request is sent to the relay system node 306 to request attestation evidence 320 that indicates a legitimacy of the relay system node 306. In some embodiments, the attestation evidence 320 includes the measurement value 322, the public key 324, and the signature 326 of the relay system node 306.

In response to the attestation request, the relay system node 306 generates (406) the attestation evidence 320. As noted above, the attestation evidence 320 indicates a legitimacy the relay system node 306, and includes the measurement value 322, the public key 324, and the signature 326 of the relay system node 306.

In some embodiments, the measurement value 322 may include a digest of an initial state of the relay system node 306. For example, the measurement value 322 may include a hash value of a process code that is implemented on the relay system node 306. The public key 324 may be generated randomly by the relay system node 306 along with a private key using a predetermined key generation algorithm, for example such as, Rivest-Shamir-Adleman (RSA) algorithm. In some examples, the public key 324 is provided in the attestation evidence 320 and sent to the user device 304, and can be used for future communication between the user device 304 and the relay system node 306. For example, the relay system node 306 may use its private key to generate a signature of a query result and the user device 304 can use the public key 324 to verify the signature. The signature 326 in the attestation evidence 320 includes the measurement value 322 and the public key 324 that are signed using an attestation key (e.g., an EPID private key) of the relay system node 306.

The relay system node 306 sends (408) the attestation evidence 320 as generated above to the user device 304 in response to the attestation request from the user device 304.

The user device 304 forwards (410) the attestation evidence 320 from the relay system node 306 to the attestation service 308. In some embodiments, the user device 304 sends an attestation verification request to the attestation service 308. The attestation verification request includes the attestation evidence 320 of the relay system node 306, and some supplemental information, such as, for example, a descriptor that indicates whether the relay system node 306 uses the SGX platform service.

The attestation service 308 verifies (412) the attestation evidence 320 in response to receiving the attestation evidence 320 forwarded by the user device 304. As noted, the attestation evidence 320 includes the measurement value 322, the public key 324, and the signature 326 of the relay system node 306. The signature 326 includes the measurement value 322 and the public key 324 that are signed using an attestation key (e.g., EPID private key) of the relay system node 306. The attestation service 308 may verify the attestation evidence 320 by verifying the signature 326 in the attestation evidence 320 using an attestation key (e.g., EPID public key) of the attestation service 308.

If the attestation service 308 determines that the signature 326 in the attestation evidence 320 is valid, the attestation service 308 determines that the relay system node 306 is a trusted entity. If the attestation service 308 determines that the signature 326 in the attestation evidence 320 is invalid, the attestation service 308 determines that the relay system node 306 is not a trusted entity, and can reject any subsequent data and requests from the relay system node 306.

The attestation service 308 generates (414) an AVR 330 based on a verification of the attestation evidence 320. In some embodiments, the AVR 330 can include the attestation evidence 320, an attestation verification result 334, and a digital signature 336 of the attestation service 308. In some embodiments, the AVR 330 may include the attestation evidence 320 excluding the signature 326 of the relay system node 310. For example, the AVR 330 may include the measurement value 322, the public key 324, the attestation verification result 334, and the signature 336 of the attestation service 308.

The attestation verification result 334 in the AVR 330 indicates whether the signature 326 in the attestation evidence 320 is valid. For example, the attestation verification result 330 may include a value of "valid," or "OK" that indicates the signature 326 in the attestation evidence 320 is valid or a value of "invalid" that indicates the signature 326 is invalid.

In some embodiments, the signature 336 of the attestation service 308 in AVR 330 includes the attestation evidence 320 and the attestation verification result 334 that are signed using a report signing key. The report signing key may be a private key that the attestation service 308 uses to sign the AVR 330. In some embodiments, the report signing key is generated by the attestation service 308 using a predetermined key generated algorithm. For example, the report signing key may be generated using the RSA-Secure Hash Algorithm (SHA) 256.

In some embodiments, the attestation service 308 sends (416) the AVR 330 to the user device 304. As noted above, the AVR 330 includes a cryptographically signed report of verification of identity of the relay system node 306, and can include the attestation evidence 320, an attestation verification result 335, and a digital signature 336 of the attestation service 308.

In some embodiments, the user device 304 verifies (418) the AVR 330 upon receiving the AVR 330 from the attestation service 308. For example, the user device 304 may verify the signature 336 of the attestation service 308 in the AVR 330. In some embodiments, the user device 304 verifies the signature 336 in the AVR 330 using a report signing certificate. The report signing certificate may be an X.509 digital certificate. The report signing certificate can be paired with the report signing key the attestation service 312 uses to sign the AVR. If the user device 304 verifies that the signature 336 of the attestation service 308 in the AVR 330 is valid, the user device 304 determines that the AVR 330 is indeed sent by the attestation service 308. If the user device 304 determines that the signature 336 in the AVR 330 is invalid, the user device 304 determines that the AVR 330 is not genuine, and can reject the AVR 330. The user device 304 may further inspect the attestation verification result 334 in the AVR 330 to determine whether the signature 326 in the attestation evidence 320 is valid.

In some embodiments, the user device 304 further compares the measurement value 322 in the attestation evidence 320 with a measurement value 322 that is previously obtained from the developer server 302 to determine whether the attestation evidence 320 is valid.

The user device 304 registers (420) the relay system node 306 as a trusted entity in response to determining that the AVR 330 is genuine. For example, the user device 304 can deem the relay system node 306 to be trustworthy if the measurement value 322 in AVR 330 matches the measurement value 322 previously obtained from the developer server 302, the verification result 334 indicates the signature 326 is valid, and/or signature 336 is verified to be valid. The user device 304 may further store the public key 324 that is included in the attestation evidence 320 in the AVR 330. The public key 324 will be used by the user device 304 for authentication and encryption of future communication between the user device 304 and the relay system node 306.

Figure 5:
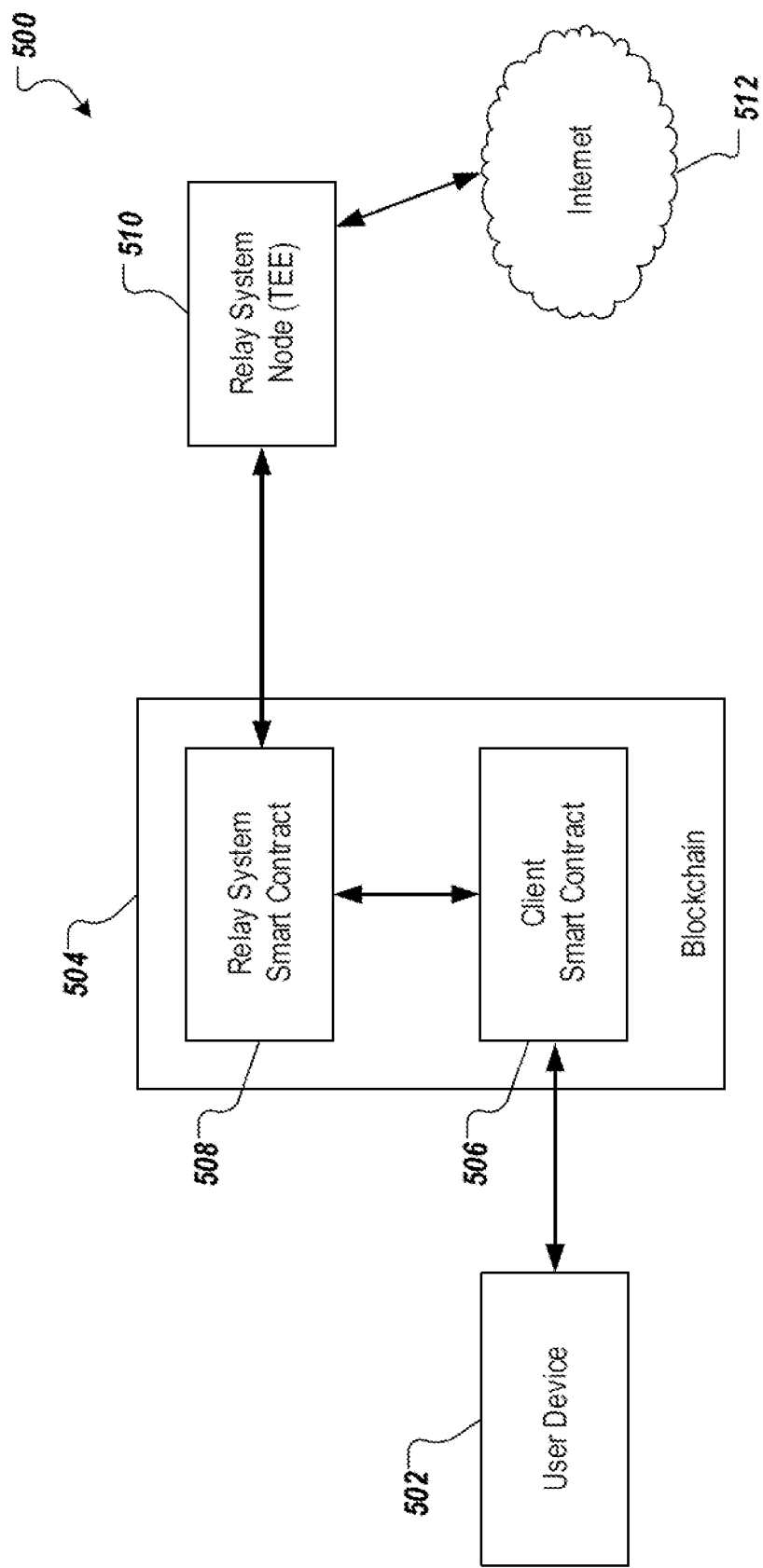
FIG. 5 is a diagram illustrating an example of a system in accordance with embodiments of this specification.

FIG. 5 is a diagram illustrating an example of a system 500 in accordance with embodiments of this specification. As shown, system 500 includes a user device 502, a blockchain 504, a relay system node 510, and a network 514 (e.g., Internet). In the depicted example, the blockchain 504 includes a client smart contract 506 and a relay system smart contract 508. In some embodiments, the relay system node 510 is implemented using a TEE technology (e.g., Intel SGX). In general, the user device 502 requests data from a data source in the network 512 and receives retrieved data from the data source through the blockchain 504 and the relay system node 510 such that an integrity of the request and retrieved data can be verified. The relay system of FIG. 5 (e.g., the relay system smart contract 508, the relay system node 510) facilitates avoiding direct contact between the user device 502 and the relay system node, thereby avoiding exposing a position or access point of the relay system node. As such, the relay system node is less likely to be found and attacked by malicious actors over the network using, for example, distributed denial of service (DDoS) attacks. This improves a security of the relay system node, thereby further improving a security of the communication between the blockchain and the relay system node.

The user device 502, the relay system node 510 and the network 512 can be the same components as the user device 304, the relay system node 306, and the network 310 as depicted in FIG. 3, respectively. The client smart contract 506 is a smart contract that operates as a requester for an off-chain client (e.g., the user device 502) to request data or service from the network 512. The client smart contract 304 is communicatively coupled to the relay system contract 508 within the blockchain 504. The relay system smart contract 508 includes or operates as an application program interface (API) to the client smart contract 506 for processing and handling data transmitted between the client smart contract 506 and the relay system node 510. The client smart contract 506, the relay system smart contract 508, and the relay system node 510 operate together as a relay system to relay requests from the user device 502 to the network 512 and relay request results from the network 512 to the user device 502.

In operation, the user device 502 generates a request that will be relayed to the relay system node 510 through the client smart contract 506 and the relay system smart contract 508. The request is generated by the user device 502 as including an encrypted hash value such that the relay system node 510 can verify an integrity of the request based on the encrypted hash value. The verification of the request will be discussed below in greater detail with reference to FIG. 6.

Figure 6:
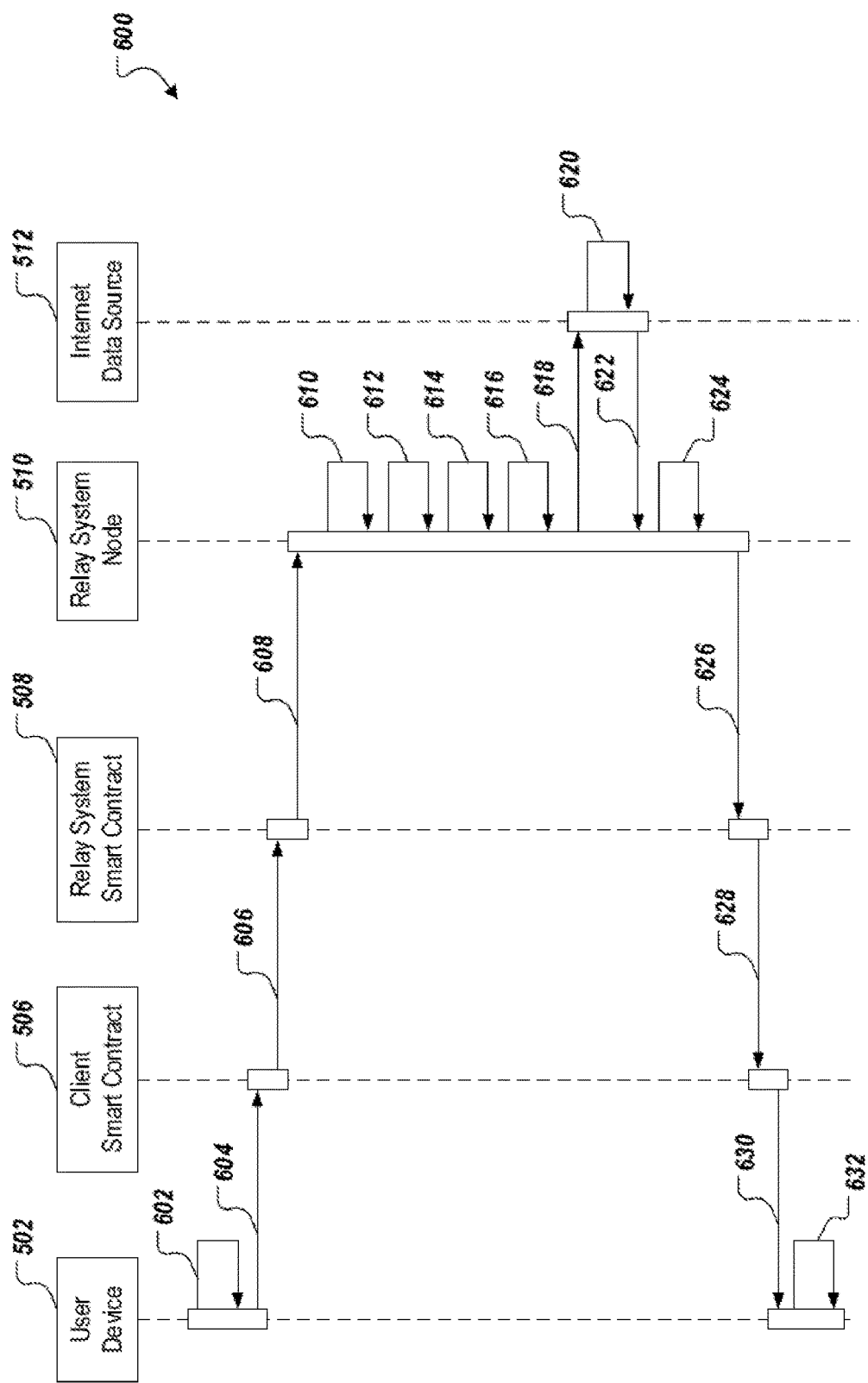
FIG. 6 a signal flow illustrating an example of a process in accordance with embodiments of this specification.

FIG. 6 depicts an example of a signal flow 600 in accordance with embodiments of this specification. The signal flow 600 represents a process for verifying requests sent to an external data source in accordance with embodiments of the present disclosure. For convenience, the process will be described as being performed by a system of one or more computers, located in one or more locations, and programmed appropriately in accordance with this specification. For example, a distributed system (e.g., the blockchain system 100 of FIG. 1; the system 500 of FIG. 5), appropriately programmed, can perform the process.

The user device 502 generates (602) a request for data or service from the Internet-based data source 512. For example, the request may be an access request for an account of a client and the client can operate the user device 502 to generate the access quest. The access request may include a plaintext portion, such as, for example, a web address, and a confidential data portion, such as, for example, credentials (e.g., a user name, a password) of the account of the user 502. The confidential data portion in the access request can be encrypted, such that malicious actors over the network cannot obtain the personal information of the user account to infiltrate the user account. However, the confidential data portion, although still encrypted, may be obtained by the malicious actors and combined with a different plaintext portion, such as, for example, a second web address. For example, the second web address can be under the same domain of the first web address, and the encrypted, confidential data portion could be used to access personal data of the client on the second web address (e.g., such an attack would be successful, if the client uses the same user name and password on the second web address as the first web address).

As described herein, embodiments of this specification mitigate such attacks by improving the integrity of the requests. In some embodiments, to improve integrity of the request and security of personal data, the request generated by the user device 502 includes a plaintext data element, and an encrypted combination of a confidential data element and a hash value of the plaintext data element. For example, user device 502 may compute a hash value of the plaintext data element and concatenate the hash value to the confidential data element. The user device 502 may further encrypt the concatenated hash value and the confidential data element using a public key that is previously generated and sent to the user device 502 by the relay system node 510. For example:

$$R \rightarrow [P, PK_{RSN}(C\|H)]$$

where:
R is the request issued by the computing device of the user to the blockchain network,
P is a plaintext portion (e.g., URL of data source that is to be queried);
$PK_{RSN}$ is the public key of the relay system node that queries the data source;
C is the confidential information (e.g., credentials) used to access the data source;
H is the hash of the plaintext portion P; and
∥ represents concatenation of C and H, which concatenation is encrypted using $PK_{RSN}$.

The encrypted concatenation of the hash value and the confidential data element can be decrypted by the relay system node 510 using a private key that is paired with the public key.

In some embodiments, the user device 502 encrypts the hash value and the confidential data element separately using the public key. For example, the user device 502 may encrypt the hash value using the public key and encrypt the confidential data element using the public key. The user device 502 combines (e.g., concatenates) the encrypted hash value and the encrypted confidential data element. For example:

$$R \rightarrow [P, (PK_{RSN}(C) \| PK_{RSN}(H))]$$

where:
R is the request issued by the computing device of the user to the blockchain network,
P is a plaintext portion (e.g., URL of data source that is to be queried);
$PK_{RSN}$ is the public key of the relay system node that queries the data source;
C is the confidential information (e.g., credentials) used to access the data source;
H is the hash of the plaintext portion P; and
∥ represents concatenation of encrypted C and encrypted H, which are each encrypted using $PK_{RSN}$.

The encrypted of the hash value and the encrypted confidential data element of the concatenation can be decrypted by the relay system node 510 using the private key that is paired with the public key.

The user device 502 sends (604) the request to the client smart contract 506. For example, user device 502 may submit the request to blockchain 504, and the blockchain 504 assigns the request to the client smart contract 506 that is associated with user device 502. The client smart contract 506 forwards (606) the request to the relay system smart contract 508 after receiving the request from user device 502. The relay system smart contract 508 forwards (608) the request to the relay system node 510 after receiving the request from the client smart contract 506.

In some embodiments, the relay system node 510 obtains (610) the confidential data element and the hash value of the plaintext data element from the request using a private key of the relay system node 510. As noted above, the request includes a plaintext data element, and a combination of a confidential data element and a hash value of the plaintext data element that is encrypted using a public key of the relay system node 510. The relay system node 510 stores a private key that is paired with the public key the user device 502 uses to encrypt the hash value of the plaintext text data element and the confidential data element in the request. The relay system node 510 can use the private key to decrypt the encrypted combination of the hash value and the confidential data element to obtain the hash value of the plaintext data element and the confidential data element.

The relay system node 510 computes (612) a hash value of the plaintext data element in the request. For example, the relay system node 510 may obtain the plaintext data element in the request and apply a predetermined hash function to the plaintext data element to computer the hash value of the plaintext data element. The relay system node 510 compares (614) the hash value of the plaintext data element as determined at 612 with the hash value of the plaintext data element as obtained at 610. The relay system node 510 determines whether the two hash values match. If the hash values match, the relay system node 510 determines that the plaintext data element in the request has not been tampered. If the two hash values do not match, the relay system node 510 may determine that the plaintext data element has been tampered with (e.g., by a malicious actor).

The relay system node 510 verifies (616) whether the request is genuine based on the comparison of the two hash values as performed at 614. For example, if the hash value of the plaintext data element as determined at 612 matches the hash value of the plaintext data element as obtained at 610, the relay system node 510 determines that the request is intact (e.g., not tampered with). If the two hash values do not match, the relay system node 510 determines that the request has been tampered with, or is otherwise not intact. If the relay system node 510 determines that the request is not intact, the relay system node 510 may reject the request and will not query the Internet-based data source 512.

In some embodiments, in response to determining that the request is intact, the relay system node 510 sends (618) the request to the Internet-based data source 512 to obtain a request result. In some embodiments, the relay system node 510 constructs a new request that includes the plaintext data element and the confidential data element and queries the Internet-based data source 512 using the new request. For example, the new request may include a plaintext data element including a web address where the user device 502 wants to access an account, and a confidential data element including credentials (e.g., user name and password) of the user device 502 to log into the account. In some examples, the Internet-based data source 512 processes (620) the request, and returns (622) a request result to the relay system node 510.

The relay system node 510 signs (624) the request result that is received from the Internet-based data source 512, and sends (626) the signed request result to the relay system smart contract 508. For example, the relay system node 510 may generate a signature that includes the request result that is signed using the private key of the relay system node 510. The private key that the relay system node 510 uses to sign the request result is the same as the private key that the relay system node 510 previously used to decrypt the encrypted confidential data element and hash value of the plaintext data element in the request. The relay system node 510 may combine (e.g., concatenate) the signature with the request result and send them to the relay system smart contract 508. In some embodiments, the relay system node 510 computes a hash value of the request result and signs the hash value using the private key of the relay system node 510. The relay system node 510 combines the request result with the signed hash value of the request result. In this manner, the user device 502 can verify the request result by extracting the hash value of the request result using its public key, computing a hash value of the request result, and determining whether the two hash values match, as described herein.

The relay system smart contract 508 forwards (628) the request result to the client smart contract 506. The client smart contract 506 provides (630) the request result to the user device 502.

In some embodiments, the user device 502 verifies (632) the signed request by verifying the signature included in the signed request result using its public key. For example, if the signed request result includes the request result and a signed hash value of the request result, the user device 502 may obtain the hash value of the request result using its public key, computing a hash value of the request result, and determining whether the two hash values match. If the two hash values match, the user device 502 determines that the request result is valid. If the two hash values do not match, the user device 502 determines that the request result is invalid and may reject the request result.

Figure 7:
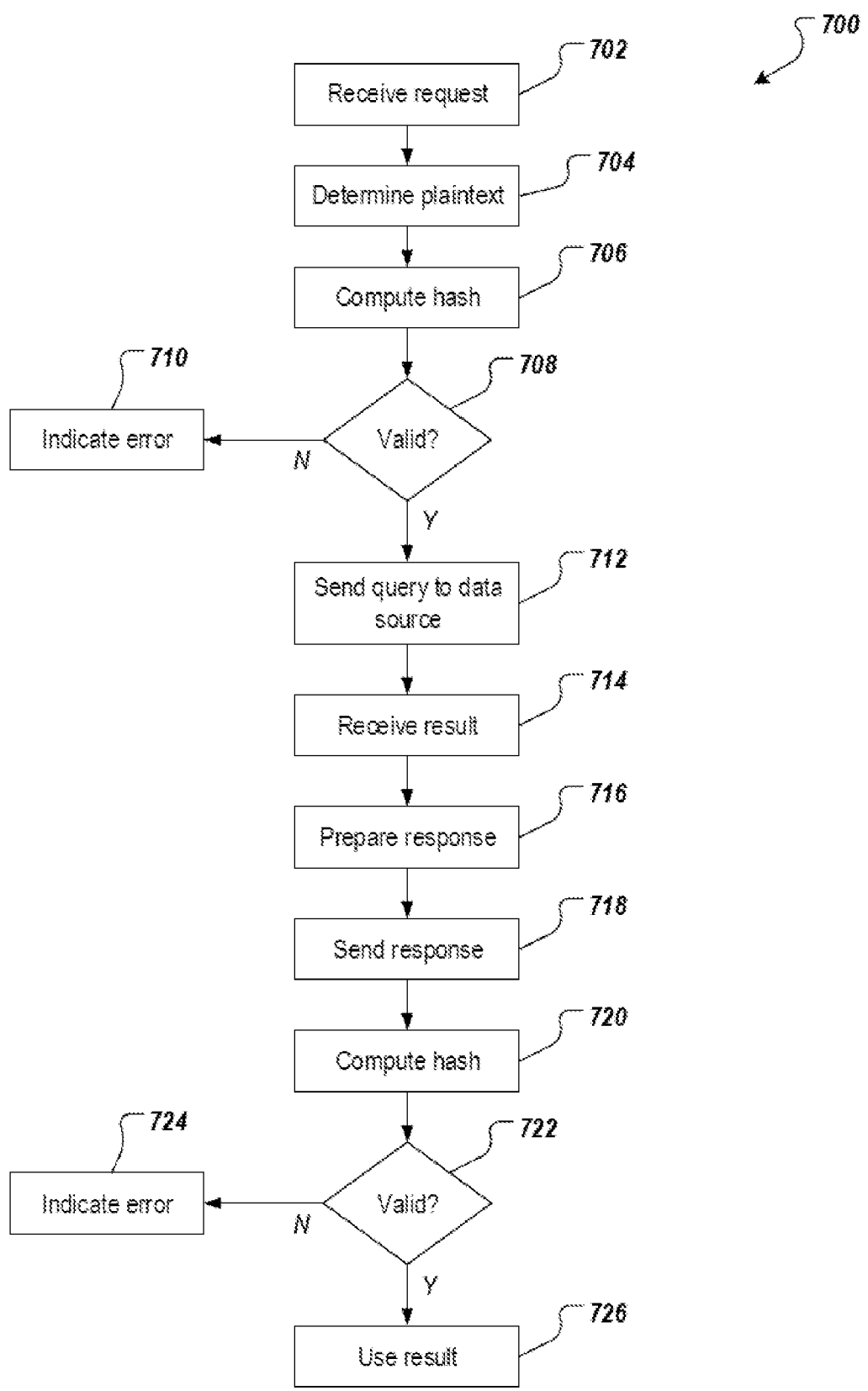
FIG. 7 is a flow chart illustrating an example of a process that can be executed in accordance with embodiments of this specification.

FIG. 7 depicts an example of a process 700 that can be executed in accordance with embodiments of this specification. In some embodiments, the example process 700 may be performed using one or more computer-executable programs executed using one or more computing devices. In some examples, the process 700 can be performed by a relay system for retrieving data that is external to a blockchain network (e.g., the client smart contract 506, the relay system smart contract 508, and the relay system node 510 of FIG. 5).

A request is received (702). For example, the relay system node 510 of FIG. 5 receives the request, which originated from the user device 502 of FIG. 5. In some examples, and as described herein, the user device 502 generates the request to include a first portion and a second portion, the first portion including plaintext data and the second portion including encrypted data, the encrypted data including access data and a first hash value, the first hash value being generated as a hash of the plaintext data using a public key of the relay system node 510. The client smart contract 506 and the relay system smart contract 508 forwards the request to the relay system node 510.

Plaintext is determined (704). For example, the relay system node 510 decrypts the encrypted data using its private key to determine the first hash value (as plaintext). A hash is computed (706). For example, the relay system node 510 processes the plaintext data of the first portion to provide a second hash value. It is determined whether the request is valid (708). For example, the relay system node 510 compares the first hash value and the second hash value. If the first hash value is the same as the second hash value, the request is valid. That is, it is determined that the integrity of the request is intact. If the first hash value is not the same as the second hash value, the request is invalid. That is, it is determined that the integrity of the request has been compromised. If the request is not valid, an error is indicated (710), and the example process 700 ends.

If the request is valid, a query is sent to the data source (712). For example, the relay system node 510 constructs the query (e.g., new request) that includes the plaintext data element and the confidential data element of the request it had received (e.g., original request). For example, the new request may include a plaintext data element including a web address where the user device 502 wants to access an account, and a confidential data element including credentials (e.g., user name and password) of the user device 502 to log into the account. The relay system node 510 queries the Internet-based data source 512 using the query.

A result is received from the data source (714). In some examples, the Internet-based data source 512 processes the request, and returns a request result (e.g., data value(s)) to the relay system node 510. A response is prepared (716), and the response is sent (718). For example, the relay system node 510 may generate a signature that includes the request result that is signed using the private key of the relay system node 510. The private key that the relay system node 510 uses to sign the request result is the same as the private key that the relay system node 510 previously used to decrypt the encrypted data in the original request. The relay system node 510 may combine (e.g., concatenate) the signature with the request result and send them to the relay system smart contract 508. In some embodiments, the relay system node 510 computes a hash value of the request result and signs the hash value using the private key. The relay system node 510 combines the request result with the signed hash value of the request result.

A hash is computed (720). For example, the user device 502 calculates a hash value based on the request result (e.g., data value(s)). It is determined whether the response is valid (722). For example, the user device 502 obtains the hash value of the request result using the public key, and determines whether it matches the computed hash value. If the two hash values match, the user device 502 determines that the request result is valid. If the two hash values do not match, the user device 502 determines that the request result is invalid and may reject the request result. If the request is not valid, an error is indicated (724), and the example process 700 ends. If the request is valid, the integrity of the request result is intact, and the request result is provided to the user device 502 for further processing.

Figure 8:
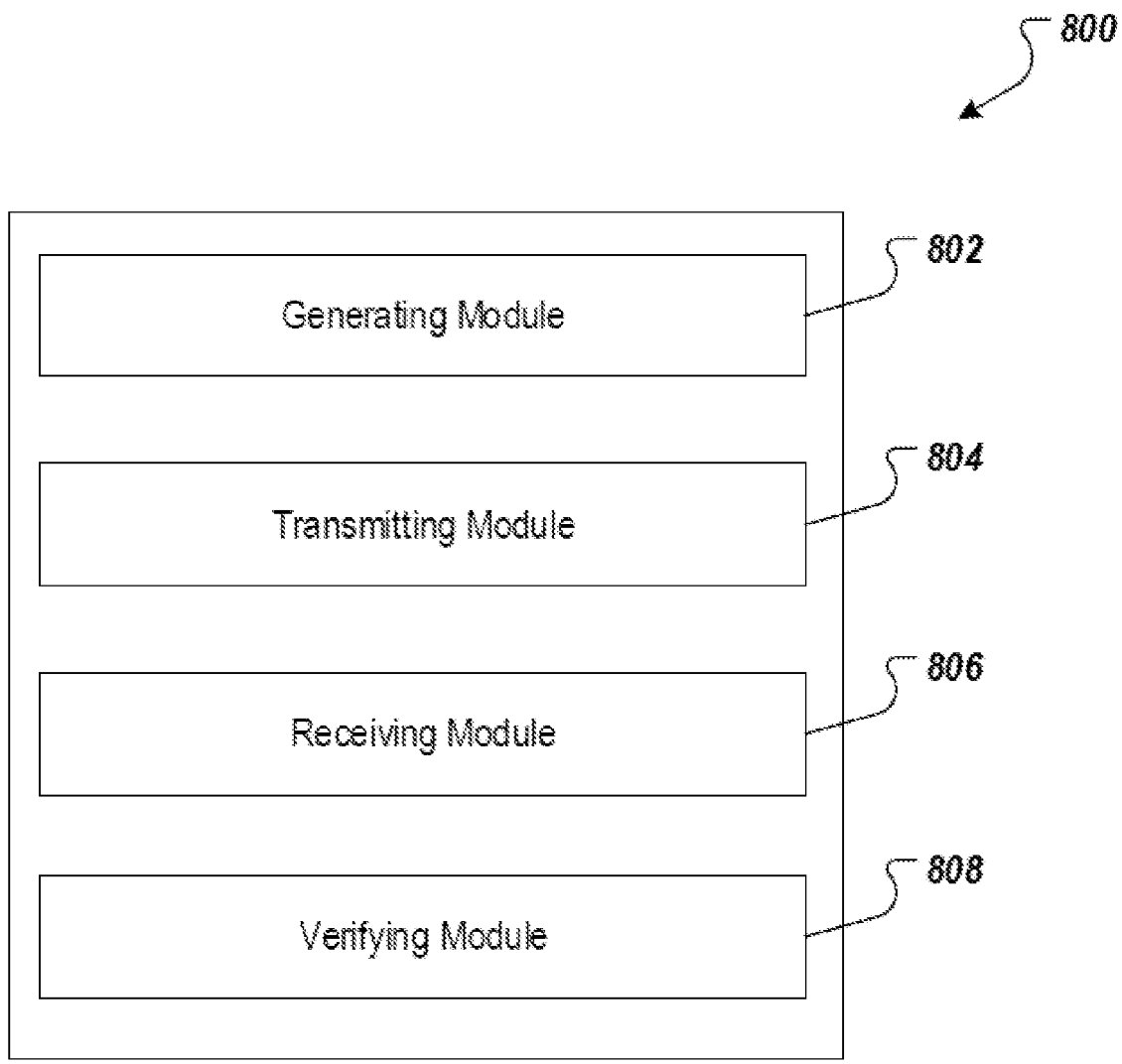
FIG. 8 is a diagram illustrating an example of modules of an apparatus in accordance with embodiments of this specification.

FIG. 8 depicts examples of modules of an apparatus 800 in accordance with embodiments of this specification. The apparatus 800 can be an example embodiment of a user computing device. In some examples, the user computing device issues requests to and receives responses from one or more components of a relay system that are external to the blockchain network, and that query data sources that are external to the blockchain network.

The apparatus 800 can correspond to the embodiments described above, and the apparatus 800 includes the following: a generating module 802 that generates a request for data from the data source, the request including a first portion and a second portion, the first portion including plaintext data and the second portion including encrypted data, the encrypted data including access data and a first hash value, the first hash value being generated as a hash of the plaintext data by a user computing device that submits the request; a transmitting module 804 that transmits the request to a relay system component external to the blockchain network; a receiving module 806 that receives a result from the relay system component, the result including result data and a second hash value, the result data being retrieved using the access data and the second hash value being generated based on the result data and digitally signed using a private key of the relay system component; and a verifying module 808 that verifies an integrity of the result based on a public key of the relay system component, a digital signature of the result and the second hash value.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIG. 8, it can be interpreted as illustrating an internal functional module and a structure of a blockchain data retrieving apparatus. The blockchain data retrieving apparatus can be an example of a user computing device. An execution body in essence can be an electronic device, and the electronic device includes the following: one or more processors; and one or more computer-readable memories configured to store an executable instruction of the one or more processors. In some embodiments, the one or more computer-readable memories are coupled to the one or more processors and have programming instructions stored thereon that are executable by the one or more processors to perform algorithms, methods, functions, processes, flows, and procedures, as described in this specification.

The techniques described in this specification produce one or more technical effects. In some embodiments, the integrity of requests submitted by a user computing device to relay system nodes for querying data sources that are external to a blockchain network are ensure. In some embodiments, the integrity of responses provided back to the blockchain network from the external data sources is ensured. Accordingly, embodiments of the present disclosure improve the integrity of communications between a user computing device and a relay system node through a blockchain network. In this manner, potential attack channels for malicious users are mitigated to enhance security.

Described embodiments of the subject matter can include one or more features, alone or in combination: the relay system component decrypts the encrypted data using the private key to provide the first hash value, calculates a hash value based on the plaintext data included in the request, and compares the first hash value to the hash value to verify that the plaintext data is absent any change in response to receiving the request; the relay system component transmits a query request to the data source in response to verifying the request; the relay system component includes a relay system node that receives the request from a relay system smart contract executing within the blockchain network; the plaintext data include a uniform resource locator (URL) of the data source; the relay system component executes a trusted execution environment (TEE), and the private key and the public key of the relay system component are provisioned during an attestation process of the TEE; the user computing device executes the attestation process with the relay system node and an attestation service; and the data source includes an Internet-based data source.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for retrieving data from a data source that is external to a blockchain network, the method comprising:
   generating, by a user computing device, a request for data from the data source, the request comprising a first portion and a second portion, the first portion comprising plaintext data and the second portion comprising encrypted data, the generating the request comprising:
   generating a first hash value of the plaintext data by the user computing device:
   concatenating access data and the first hash value to generate a concatenated data element; and
   encrypting, using a public key of a relay system component, the concatenated data element to generate encrypted data;
   transmitting, by the user computing device, the request to the relay system component through the blockchain network, wherein the relay system component is external to the blockchain network, wherein the request is configured to cause the relay system component to:
   decrypt the encrypted data using a private key of the relay system component to provide the first hash value,
   calculate a second hash value based on the plaintext data included in the request,
   compare the first hash value to the second hash value to determine that the first hash value is identical to the second hash value, and
   transmit a result responsive to determining that the first hash value is identical to the second hash value;
   receiving, by the user computing device, the result from the relay system component through the blockchain network, the result comprising result data and a third hash value, the result data being retrieved using the access data and the third hash value being generated based on the result data, the result being digitally signed using the private key of the relay system component; and
   verifying, by the user computing device, an integrity of the result based on a public key of the relay system component, a digital signature of the result, and the third hash value.

2. The method of claim 1, wherein the relay system component transmits a query request to the data source in response to verifying the request.

3. The method of claim 1, wherein the relay system component comprises a relay system node that receives the request from a relay system smart contract executing within the blockchain network.

4. The method of claim 1, wherein the plaintext data comprises a uniform resource locator (URL) of the data source.

5. The method of claim 3, wherein the relay system component executes a trusted execution environment (TEE), and the private key and the public key of the relay system component are provisioned during an attestation process of the TEE.

6. The method of claim 5, wherein the user computing device executes the attestation process with the relay system node and an attestation service.

7. The method of claim 1, wherein the data source comprises an Internet-based data source.

8. A non-transitory, computer-readable storage medium storing instructions executable by a computer system and that upon such execution cause the computer system to perform operations for retrieving data from a data source that is external to a blockchain network, the operations comprising:
   generating, by a user computing device, a request for data from the data source, the request comprising a first portion and a second portion, the first portion comprising plaintext data and the second portion comprising encrypted data, the generating the request comprising:
   generating a first hash value of the plaintext data by the user computing device:
   concatenating access data and the first hash value to generate a concatenated data element; and
   encrypting, using a public key of a relay system component, the concatenated data element to generate encrypted data;
   transmitting, by the user computing device, the request to the relay system component through the blockchain network, wherein the relay system component is external to the blockchain network, wherein the request is configured to cause the relay system component to:
   decrypt the encrypted data using a private key of the relay system component to provide the first hash value,
   calculate a second hash value based on the plaintext data included in the request, compare the first hash value to the second hash value to determine that the first hash value is identical to the second hash value, and transmit a result responsive to determining that the first hash value is identical to the second hash value;

receiving, by the user computing device, the result from the relay system component through the blockchain network, the result comprising result data and a third hash value, the result data being retrieved using the access data and the third hash value being generated based on the result data, the result being digitally signed using the private key of the relay system component; and verifying, by the user computing device, an integrity of the result based on a public key of the relay system component, a digital signature of the result, and the third hash value.

9. The non-transitory, computer-readable storage medium of claim 8, wherein the relay system component transmits a query request to the data source in response to verifying the request.

10. The non-transitory, computer-readable storage medium of claim 8, wherein the relay system component comprises a relay system node that receives the request from a relay system smart contract executing within the blockchain network.

11. The non-transitory, computer-readable storage medium of claim 8, wherein the plaintext data comprises a uniform resource locator (URL) of the data source.

12. The non-transitory, computer-readable storage medium of claim 10, wherein the relay system component executes a trusted execution environment (TEE), and the private key and the public key of the relay system component are provisioned during an attestation process of the TEE.

13. The non-transitory, computer-readable storage medium of claim 12, wherein the user computing device executes the attestation process with the relay system node and an attestation service.

14. The non-transitory, computer-readable storage medium of claim 8, wherein the data source comprises an Internet-based data source.

15. A computer-implemented system, comprising: one or more computers; and one or more computer memory devices interoperably coupled with the one or more computers and having tangible, non-transitory, machine-readable media storing instructions that, when executed by the one or more computers, cause the one or more computers to perform operations for retrieving data from a data source that is external to a blockchain network, the operations comprising:

generating, by a user computing device, a request for data from the data source, the request comprising a first portion and a second portion, the first portion comprising plaintext data and the second portion comprising encrypted data, the generating the request comprising:

generating a first hash value of the plaintext data by the user computing device:

concatenating access data and the first hash value to generate a concatenated data element; and encrypting, using a public key of a relay system component, the concatenated data element to generate encrypted data;

transmitting, by the user computing device, the request to the relay system component through the blockchain network, wherein the relay system component is external to the blockchain network, wherein the request is configured to cause the relay system component to:

decrypt the encrypted data using a private key of the relay system component to provide the first hash value, calculate a second hash value based on the plaintext data included in the request, compare the first hash value to the second hash value to determine that the first hash value is identical to the second hash value, and transmit a result responsive to determining that the first hash value is identical to the second hash value;

receiving, by the user computing device, the result from the relay system component through the blockchain network, the result comprising result data and a second third hash value, the result data being retrieved using the access data and the second third hash value being generated based on the result data, the result being digitally signed using the private key of the relay system component; and verifying, by the user computing device, an integrity of the result based on a public key of the relay system component, a digital signature of the result, and the second third hash value.

16. The system of claim 15, wherein the relay system component transmits a query request to the data source in response to verifying the request.

17. The system of claim 15, wherein the relay system component comprises a relay system node that receives the request from a relay system smart contract executing within the blockchain network.

18. The system of claim 15, wherein the plaintext data comprises a uniform resource locator (URL) of the data source.

19. The system of claim 17, wherein the relay system component executes a trusted execution environment (TEE), and the private key and the public key of the relay system component are provisioned during an attestation process of the TEE.

20. The system of claim 19, wherein the user computing device executes the attestation process with the relay system node and an attestation service.

21. The system of claim 15, wherein the data source comprises an Internet-based data source.

* * * * *